United States Patent

Saibara et al.

[11] Patent Number: 5,886,079
[45] Date of Patent: Mar. 23, 1999

[54] POLYMER FINE PARTICLES AND INK COMPOSITION CONTAINING THE SAME

[75] Inventors: Shouji Saibara, Toride; Kouji Takazawa, Abiko, both of Japan

[73] Assignee: Hitachi Maxell, Ltd., Osaka, Japan

[21] Appl. No.: 757,549

[22] Filed: Nov. 27, 1996

[30] Foreign Application Priority Data

Nov. 28, 1995 [JP] Japan ................................. 7-332701
Nov. 19, 1996 [JP] Japan ................................. 8-323427

[51] Int. Cl.$^6$ ....................................................... C08K 5/09
[52] U.S. Cl. ........................... 524/458; 523/200; 523/201; 524/460; 524/504; 525/902
[58] Field of Search ..................... 523/200, 201; 524/458, 460, 504; 525/902

[56] References Cited

U.S. PATENT DOCUMENTS 5,302,654  4/1994  Ishii et al. ................................. 524/458
5,618,859  4/1997  Maeyama et al. ...................... 523/201

FOREIGN PATENT DOCUMENTS 60-42833  9/1985  Japan .
5-163700  6/1993  Japan .

OTHER PUBLICATIONS

C. Wu (1994) *Macromolecules* vol. 27 (24): 7099–7102.

Primary Examiner—Marion McCamish
Assistant Examiner—John J. Guarriello
Attorney, Agent, or Firm—Birch, Stewart, Kolasch & Birch, LLP

[57] ABSTRACT

Polymer fine particles are obtained by emulsion-polymerizing one or more monomers having a carboxylate group represented by the following formula and an unsaturated group that is radical polymerizable:

$$—COO^-X^+ \quad (I)$$

wherein in the formula (I), $X^+$ is one species selected from the group consisting of monovalent metal ion,

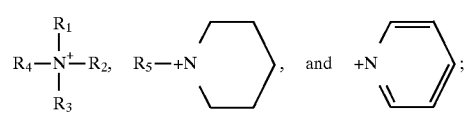

wherein $R_1$ to $R_5$ may be the same or different, representing hydrocarbon groups having a number of carbon atom or atoms of 1 to 4 respectively. Alternatively, polymer fine particles may be obtained by performing emulsion polymerization in the presence of a compound containing the foregoing carboxylate group. In the obtained polymer fine particles, the carboxylate group is incorporated into surfaces of the fine particles by the aid of covalent bond or physical adsorption. Metallic parts such as those contained in a printer are not corroded owing to the presence of the carboxylate group on the surfaces of the fine particles.

13 Claims, No Drawings

POLYMER FINE PARTICLES AND INK COMPOSITION CONTAINING THE SAME

BACKGROUND OF THE INVENTION

1. Field of the Invention

The present invention relates to polymer fine particles and an ink composition containing the same. In particular, the present invention relates to polymer fine particles and an ink composition containing the same, wherein the polymer fine particles are excellent in dispersion stability, and they stably carry a dye or a pigment in the ink composition.

2. Description of the Related Art

Polymer fine particles attract attention in various fields such as those concerning paints and inks, since polymer fine particles can be used as, for example, a cosmetic additive, a plastic modifier, and a viscosity-adjusting agent. For example, Japanese Patent Publication No. 60-42833 discloses an ink for ink-jet printers, containing polymer fine particles prepared by emulsion-polymerizing a vinyl monomer, the polymer fine particles being impregnated with or adsorbed to a dye. Usually, as for such polymer fine particles, in order to improve the dispersion stability of the particles in a medium, surfaces of the polymer fine particles are modified with electrically charged groups. The polymer fine particles disclosed in the foregoing patent document have their surfaces modified with sulfonic groups such as $-SO_3Na$. On the other hand, Japanese Patent Laid-open No. 5-163700 discloses a paint composition containing emulsion particles made of a polymer together with a pigment. In this technique, polymer fine particles are also modified with sulfonate groups or the like.

However, the sulfonate group involves a problem that the dye or the pigment in the ink or the paint composition is deteriorated because the sulfonate group is a strong acid polar group. Especially, when an ionic dye is contained in the paint, the dye is markedly deteriorated. Further, when the ink composition or the paint containing such polymer fine particles is used in a machine such as a printer having metallic parts, a problem arises in that halide ion corrodes the metallic parts such as a printer nozzle.

On the other hand, polymer fine particles, which have surfaces modified with ammonium salt groups, are known (for example, C. Wu, Macromolecules, 27, 7099 (1994)). Such polymer fine particles do not cause the problem of deterioration of the dye because the particles have weakly basic surfaces. However, usually, the counterion of the ammonium base is principally halide ion represented by chloride ion. Therefore, when an ink composition containing such polymer fine particles is used in a printer, a problem arises in that halide ion corrodes metallic parts such as a printer nozzle.

SUMMARY OF THE INVENTION

Therefore, an object of the present invention is to provide polymer fine particles and an ink composition containing the same, the polymer fine particles being excellent in dispersion stability, not corroding metal, and not deteriorating a dye or a pigment.

According to a first aspect of the present invention, there are provided polymer fine particles comprising a polymerization reaction product obtained by emulsion-polymerizing one or more monomers having an unsaturated group capable of radical polymerization;

at least one of the monomers being a compound which has a carboxylate group and the unsaturated group capable of radical polymerization.

According to a second aspect of the present invention, there are provided polymer fine particles comprising a polymerization reaction product obtained by emulsion-polymerizing one or more monomers having an unsaturated group capable of radical polymerization;

the emulsion polymerization being performed in the presence of a surfactant containing a carboxylate group.

According to a third aspect of the present invention, there is provided an ink composition comprising the polymer fine particles according to the first aspect of the present invention, having a particle diameter of 10 to 300 nm, a dye, a binder, and a solvent principally composed of water.

According to a fourth aspect of the present invention, there is provided an ink composition comprising the polymer fine particles according to the second aspect of the present invention, having a particle diameter of 10 to 300 nm, a pigment, a binder, and a solvent principally composed of water.

DETAILED DESCRIPTION OF PREFERRED EMBODIMENTS

The polymer fine particles according to the first aspect of the present invention can be produced by emulsion-polymerizing, in an aqueous medium, a compound having a carboxylate group and an unsaturated group capable of radical polymerization, and a monomer having an unsaturated group capable of radical polymerization as described later on. Accordingly, the polymer fine particles are obtained, in which the carboxylate group is incorporated into surfaces of the fine particles through covalent bond. The carboxylate group is preferably a group represented by the following formula (I):

$$-COO^-X^+ \quad\quad (I)$$

wherein in the formula (I), $X^+$ is one species selected from the group consisting of monovalent metal ion,

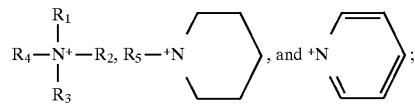

wherein $R_1$ to $R_5$ may be the same or different, representing hydrocarbon groups having a number of carbon atom or atoms of 1 to 4 respectively.

Especially, the carboxylate group (I) represented by the formula (I) is preferably a carboxylate group represented by the following formula:

$$-COO^-X^+$$

wherein $X^+$ is one species selected from the group consisting of:

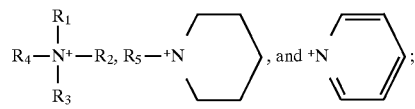

wherein $R_1$ to $R_5$ may be the same or different, representing hydrocarbon groups having a number of carbon atom or atoms of 1 to 4 respectively, because the carboxylate groups represented by the foregoing formula do not agglomerate the polymer fine particles regardless of the type of a dye or an additive to be used.

The compound having the carboxylate group and the unsaturated group capable of radical polymerization may be an arbitrary compound to be used provided that the compound contains the carboxylate group (I) described above and has the unsaturated group capable of radical polymerization. However, for example, the compound is exemplified by those represented by the following general formula (II):

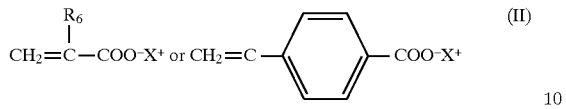  (II)

wherein in the formula (II), $X^+$ is one species selected from the group consisting of monovalent metal ion,

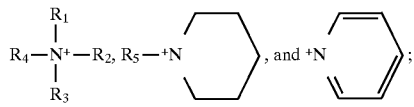

wherein $R_1$ to $R_5$ may be the same or different, representing hydrocarbon groups having a number of carbon atom or atoms of 1 to 4, and $R_6$ represents hydrogen or a methyl group.

The compound having the carboxylate group and the unsaturated group capable of radical polymerization described above is preferably used in an amount of 0.05 to 5 parts by weight with respect to 10 parts by weight of the monomer as described later on. If the compound is used in an amount of less than 0.05 part by weight with respect to 10 parts by weight of the monomer, the dispersion stability of the polymer fine particles is lowered. If the compound is used in an amount exceeding 5 parts by weight, the viscosity of the system is increased. More preferably, the compound having the carboxylate group and the unsaturated group capable of radical polymerization is used in an amount of 0.1 to 2 parts by weight with respect to 10 parts by weight of the monomer.

The polymer fine particles of the present invention can be produced by emulsion-polymerizing the compound (monomer) having the carboxylate group and the unsaturated group capable of radical polymerization, and the second monomer. The second monomer used for the emulsion polymerization may be (A) a monomer having one unsaturated group capable of radical polymerization singly, or a mixture of two or more species of such monomers. It is allowable to use a combination of the monomer or the monomer mixture of the foregoing item (A), and (B) a cross-linkable monomer having two or more unsaturated groups capable of radical polymerization. In this procedure, the mixing ratio of (A) to (B) is not specifically limited. However, the mixing ratio is preferably (A)/(B)=99/1 to 70/30 in weight ratio.

The monomer having at least one unsaturated group capable of radical polymerization (i.e., that is radical polymerization) of the foregoing item (A) includes, for example, the following compounds:

1) alkyl (meta)acrylate, for example, methyl (meta)acrylate, ethyl (meta)acrylate, n-butyl (meta)acrylate, and 2-ethylhexyl (meta)acrylate;
2) polymerizable aromatic compound, for example, styrene, α-methylstyrene, t-butylstyrene, 4-vinylpyridine;
3) carboxyl group-containing monomer, for example, acrylic acid, methacrylic acid, crotonic acid, itaconic acid, maleic acid, and fumaric acid;
4) hydroxyl group-containing monomer, for example, 2-hydroxyethyl (meta)acrylate, hydroxypropyl (meta)acrylate, hydroxybutyl (meta)acrylate, allyl alcohol, and metaallyl alcohol;
5) nitrogen-containing alkyl (meta)acrylate, for example, dimethylaminoethyl (meta)acrylate,
6) polymerizable amide, for example, acrylic acid amide, and methacrylic acid amide;
7) polymerizable nitrile, for example, acrylonitrile and methacrylonitrile;
8) polymerizable glycidyl compound, for example, glycidyl (meta)acrylate;
9) α-olefin, for example, ethylene and propylene;
10) vinyl compound, for example, vinyl acetate and vinyl propionate; and
11) diene compound, for example, butadiene and isoprene.

The monomers described above can be used singly or in combination.

The monomer having, in the molecule, two or more unsaturated groups capable of polymerization of the foregoing item (B) includes, for example, ethylene glycol di(meta)acrylate, triethylene glycol di(meta)acrylate, tetraethylene glycol di(meta)acrylate, 1,3-butylene glycol di(meta)acrylate, trimethylolpropane tri(meta)acrylate, 1,4-butanediol di(meta)acrylate, neopentyl glycol di(meta)acrylate, 1,6-hexanediol di(meta)acrylate, pentaerythritol di(meta)acrylate, pentaerythritol tetra(meta)acrylate, glycerol di(meta)acrylate, glycerol allyloxydi(meta)acrylate, 1,1,1-tris(hydroxymethyl)ethane di(meta)acrylate, 1,1,1-tris(hydroxymethyl) ethane tri(meta)acrylate, 1,1,1-tris(hydroxymethyl)propane di(meta)acrylate, 1,1,1-tris(hydroxymethyl)propane tri(meta)acrylate, triallyl cyanurate, triallyl isocyanurate, triallyl trimellitate, diallyl terephthalate, diallyl phthalate, allyl (meta)acrylate, and divinylbenzene.

The polymer fine particles according to the second aspect of the present invention can be produced by emulsion-polymerizing, in an aqueous medium, the monomer (A) or the monomers (A) and (B) in combination by using the carboxylate group-containing compound as a surfactant. Thus the polymer fine particles are obtained, in which the compound containing the carboxylate group is incorporated into the surfaces of the fine particles by the aid of physical adsorption and/or twining with the polymer.

The carboxylate group-containing compound used as the surfactant may be an arbitrary compound provided that the compound is a surfactant containing the carboxylate group represented by the formula (II) described above. However, for example, the compound is exemplified by those represented by the following general formula (III):

  (III)

wherein in the formula (III), $X^+$ is one species selected from the group consisting of monovalent metal ion,

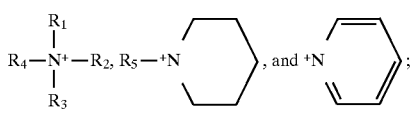

wherein $R_1$ to $R_5$ may be the same or different, representing hydrocarbon groups having a number of carbon atom or atoms of 1 to 4 respectively, and $R_7$ represents a hydrocarbon group having a number of carbon atoms of 6 to 18.

The carboxylate group-containing compound used as the surfactant is preferably used in an amount of 0.1 to 10 parts by weight with respect to 10 parts by weight of the monomer. If the carboxylate group-containing compound is used in an amount of less than 0.1 part by weight, the dispersion stability of the polymer fine particles is lowered. If the compound is used in an amount exceeding 10 parts by weight, the viscosity of the system is increased. More preferably, the carboxylate group-containing compound is used in an amount of 0.3 to 5 parts by weight with respect to 10 parts by weight of the monomer.

In the case of the polymer fine particles of the present invention, pH of the carboxylate group existing on their surfaces is approximately neutral or weakly alkaline. Accordingly, when a dye is adsorbed to the surfaces of the fine particles, the dye is not deteriorated. Therefore, the ink composition produced by using the polymer fine particles of the present invention is excellent in long-term stability of the dye or the pigment.

The polymer fine particles of the present invention are obtained, by the emulsion polymerization, as those having an average particle diameter of 10 to 300 nm. The average particle diameter in this range allows, for example, the ink composition to have excellent dispersion stability in the medium.

A preparation of the polymer fine particles produced by the emulsion polymerization as described above is obtained in a form of a synthetic latex in which the polymer fine particles are dispersed in the medium. The preparation can be used for a variety of applications as it is in a form containing the medium. Depending on applications, the polymer fine particles may be used after removing the mixed solvent by means of, for example, solvent exchange, azeotropic distillation, centrifugation, filtration, and drying.

For example, a dye, a binder, and optionally a water-soluble organic solvent, an ultraviolet-absorbing agent, a surfactant, an anti-clogging agent, and a microbicide are added to a dispersion solution of the polymer fine particles obtained by the emulsion polymerization as described above. Thus the ink composition of the present invention, which comprises the polymer fine particles, the dye, the binder, and the solvent principally composed of water, can be easily produced. The ink composition thus obtained exhibits excellent dispersion stability. Moreover, deterioration of the dye is remarkably suppressed. The ink composition may be prepared by using a pigment or a pigment dispersion obtained by dispersing the pigment, instead of the use of the dye. The ink composition obtainable in this procedure is also excellent in dispersion stability.

Those usable as an organic dye to be used for the ink composition of the present invention include arbitrary organic dyes, preferably including, for example, acid dye, direct dye, cationic dye, mordant dye, acid mordant dye, sulfur dye, sulfur vat dye, vat dye, soluble vat dye, azoic dye, disperse dye, reactive dyestuff, oxidation color, dyestuff for synthetic fiber, and fluorescent brightening agent. These organic dyes may be used singly or in combination as a mixture of two or more species. Especially, in the case of an oil-soluble organic dye, the organic dye sediments in the conventional ink composition. However, when the polymer fine particles of the present invention are used, the organic dye is incorporated into the polymer fine particles during production of the ink composition. Thus the produced ink composition can be stable. The organic dye may be used in combination with other dyes.

When the pigment is used in the ink composition of the present invention, it is possible to use, for example, organic pigment and carbon black.

Those usable as the binder to be used for the ink composition of the present invention include arbitrary resins provided that the resin is water soluble. The resin includes, for example, polyacrylic ester resin, polymethacrylic ester resin, polyvinyl chloride resin, benzoguanamine resin, alkyd resin, urea resin, vinyl chloride-vinyl acetate copolymer, aromatic sulfonamide resin, and styrol resin. The resin may be used singly or in combination as a mixture of two or more species.

The ink composition of the present invention can be also utilized as an ink for ink-jet printers, a general printing ink, and a paint, as well as for special applications such as those used for producing color filters for liquid crystal displays.

An additive may be appropriately added to the ink composition of the present invention depending on applications. For example, in the case of the use as an ink for ink-jet printers, it is possible to add, to the ink composition, a variety of additives having been hitherto used in the ink for ink-jet printers, such as anti-clogging agent for printing heads, antifoam for the ink, drying agent, microbicide, humectant, pH-adjusting agent, and agent for giving water resistance to printed matters.

A toner composition can be also produced by using the polymer fine particles of the present invention. The polymer fine particles of the present invention can be also applied to a preparation for pharmaceuticals and cosmetics by combining the polymer fine particles with appropriate components.

EXAMPLES

Production of Polymer Fine Particles

Example 1

180 grams of Deionized water was added to a three-necked flask (2 liters) installed with a cooling tube, an agitator, and a dropping funnel, which was then heated to 70° C. in an oil bath. An aqueous solution obtained by dissolving 2.0 grams of ammonium persulfate in 50 grams of deionized water was added dropwise to the flask over 2 hours. On the other hand, 25.0 grams of tetramethylammonium salt of lauric acid and 5.0 grams of amyl alcohol were dissolved in 375 grams of deionized water to obtain a solution which was added with a monomer composition comprising 100 grams of styrene, 75 grams of methylmethacrylate, 50 grams of butylacrylate, and 30 grams of divinylbenzene to prepare an emulsion solution. The emulsion solution was added dropwise to the foregoing three-necked flask over 2 hours. After 5 hours passed, the polymerization was completed. An emulsion of a pale blue semitransparent solution was obtained by the polymerization. The particle diameter of a polymerization product in the emulsion was measured in accordance with DLS (Dynamic Laser Light Scattering). As a result, the particle diameter was 55 nm.

Example 2

Polymer fine particles were synthesized in the same manner as described in Example 1 except that 25.0 grams of tetramethylammonium salt of lauric acid was changed to 20 grams of sodium laurate. The particle diameter of an obtained polymerization product was measured in the same manner as described in Example 1. As a result, the particle diameter was 60 rm.

Example 3

Polymer fine particles were synthesized in the same manner as described in Example 1 except that 25.0 grams of tetramethylammonium salt of lauric acid was changed to 20 grams of tetramethylammonium salt of myristic acid. The particle diameter of an obtained polymerization product was measured in the same manner as described in Example 1. As a result, the particle diameter was 85 nm.

Example 4

180 grams of Deionized water was added to a three-necked flask (2 liters) installed with a cooling tube, an agitator, and a dropping funnel, which was then heated to 70° C. in an oil bath. An aqueous solution obtained by dissolving 20. grams of ammonium persulfate in 50 grams of deionized water was added dropwise to the flask over 2 hours. On the other hand, 15.0 grams of polyoxyethylene/polyoxypropylene block polymer (produced by Sanyo Chemical Industries, trade name: New Pole PE-78) and 5.0 grams of amyl alcohol were dissolved in 375 grams of deionized water to obtain a solution which was added with a monomer composition comprising 100 grams of styrene, 70 grams of methylmethacrylate, 50 grams of butylacrylate, 10 grams of tetramethylammonium salt of methacrylic acid, and 25 grams of divinylbenzene to prepare an emulsion solution. The emulsion solution was added dropwise to the foregoing three-necked flask over 2 hours. After 5 hours passed, the polymerization was completed. The particle diameter of an obtained polymerization product was measured in the same manner as described in Example 1. As a result, the particle diameter was 120 nm.

Comparative Example 1

Polymer fine particles were synthesized in the same manner as described in Example 1 except that 25.0 grams of tetramethylammonium salt of lauric acid was changed to 25 grams of sodium lauryl sulfate. The particle diameter of an obtained polymerization product was measured in the same manner as described in Example 1. As a result, the particle diameter was 45 nm.

Preparation of Ink Composition

Example 5

0.2 part by weight of Rhodamine B extra was added to 100 parts by weight of a solution (emulsion)) containing the polymer fine particles obtained in Example 1 dispersed therein, followed by agitation and mixing to prepare a fluorescent pigment ink. The ink was printed onto a sheet of paper by using an ink-jet printer (produced by Hewlett-Packard, Desklet 505J) to obtain a printed matter.

Example 6

0.2 part by weight of Rhodamine B extra was added to 100 parts by weight of a solution containing the polymer fine particles obtained in Example 2 dispersed therein, followed by agitation and mixing to obtain a fluorescent pigment ink. The ink was printed onto a sheet of paper by using the ink-jet printer described above to obtain a printed matter.

Example 7

0.2 part by weight of Kayacryl Blue N2G was added to 100 parts by weight of a solution containing the polymer fine particles obtained in Example 3 dispersed therein, followed by agitation and mixing to obtain a blue pigment ink. The ink was printed onto a sheet of paper by using the ink-jet printer described above to obtain a printed matter.

Example 8

0.2 part by weight of Kayacryl Blue N2G was added to 100 parts by weight of a solution containing the polymer fine particles obtained in Example 4 dispersed therein, followed by agitation and mixing to obtain a blue pigment ink. The ink was printed onto a sheet of paper by using the ink-jet printer to obtain a printed matter.

Comparative Example 2

0.2 part by weight of Kayacryl Blue N2G was added to 100 parts by weight of a solution containing the polymer fine particles obtained in Comparative Example 1 dispersed therein, followed by agitation and mixing to obtain a blue pigment ink. The ink was printed onto a sheet of paper by using the ink-jet printer to obtain a printed matter.

Comparative Example 3

An ink was prepared in the same manner as described in Example 6 except that 100 parts by weight of the solution containing the polymer fine particles obtained in Example 3 dispersed therein was changed to 100 parts by weight of deionized water. The obtained ink was printed onto a sheet of paper by using the ink-jet printer to obtain a printed matter.

Storage Stability Test

The inks prepared in Examples 5 to 8 and Comparative Examples 2 and 3 were stored at 50° C. for 100 hours in a constant temperature bath. After that, the change in color of the ink was visually observed. As a result of the observation, evaluation was made such that a case of no change was indicated by "good", and a case of occurrence of change in color as compared with an initial state was indicated by "bad". Occurrence of any extraneous matter, agglomeration, and precipitation were not observed after the storage stability test for the inks prepared in Examples 5 to 8 and Comparative Examples 2 and 3.

Spreading Property Test

The inks prepared in Examples 5 to 8 and Comparative Examples 2 and 3 were printed onto sheets of paper by using the ink-jet printer to measure diameters of printed dots. Spreading of a dot obtained for Example 4 was used as a standard. Evaluation was made such that a case of spreading of less than 10%, as compared with the standard, was indicated by "good", and a case of spreading of not less than 10% was indicated by "bad".

Light Resistance Test

The printed matters were irradiated with ultraviolet light for 10 hours by using a fadeometer to visually observe discoloration. In this test, evaluation was made such that a case of no or little discoloration was indicated by "good", a case of a little discoloration was indicated by "not so good", and a case of apparent discoloration was indicated by "bad".

TABLE 1

|  | Storage stability test | Spreading property test | Light resistance test |
| --- | --- | --- | --- |
| Example 5 | good | — | good |
| Example 6 | good | good | good |
| Example 7 | good | good | good |
| Example 8 | good | good | good |
| Com. Ex. 2 | bad | good | bad |
| Com. Ex. 3 | good | bad | bad |

As clarified from Table 1, it is understood that the ink compositions of Examples 5 to 8, based on the use of the polymer fine particles of the present invention produced in Examples 1 to 4 respectively, are excellent in dispersion stability, as well as they enjoy remarkable suppression concerning deterioration of the dye, and they suffer little spreading of printed matters.

The polymer fine particles of the present invention exhibit excellent dispersion stability in an aqueous medium such as the ink composition, with which it is possible to avoid deterioration of a dye or a pigment contained in the ink composition or the like. The polymer fine particles of the present invention do not corrode metallic parts such as a printer nozzle when they are used in the ink composition, because they have the carboxylate group on their surfaces. Printed matters suffer less spreading when the ink composition containing the polymer fine particles of the present invention is used, as compared with any ink composition containing no polymer fine particle of the present invention.

The present invention may be practiced or embodied in other various forms without departing from the spirit or essential characteristics thereof. It will be understood that the scope of the present invention is indicated by the appended claims, and all variations and modifications concerning, for example, the presence or absence or type of solvent for the polymer fine particles, and the type or form of dye, pigment, binder, solvent and other additives for the ink composition, which come within the equivalent range of the claims, are embraced in the scope of the present invention.

What is claimed is:

1. Polymer fine particles comprising a polymerization reaction product that is obtained by emulsion-polymerizing a monomer mixture containing:

one or more monomers having a radical polymerizing unsaturated group, and wherein at least one of the monomers in the monomer mixture being emulsion-polymerized is a compound having a carboxylate group and the radical polymerizing unsaturated group, and said compound is present in an amount of 0.05 to 5 parts by weight per 10 parts by weight of monomers in the monomer mixture;

wherein the carboxylate group is represented by the following formula:

—COO⁻X⁺  (I)

wherein in the formula (I), X⁺is one species selected from the group consisting of monovalent metal ion,

wherein $R_1$ to $R_5$ may be the same or different, representing hydrocarbon groups having a number of carbon atom or atoms of 1 to 4, respectively.

2. The polymer fine particles according to claim 1, wherein the carboxylate group is represented by the following formula:

—COO⁻X⁺ wherein X⁺is one species selected from the group consisting of:

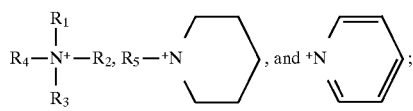

wherein $R_1$ to $R_5$ may be the same or different, representing hydrocarbon groups having a number of carbon atom or atoms of 1 to 4 respectively.

3. Polymer fine particles comprising a polymerization reaction product that is obtained by emulsion-polymerizing a monomer mixture containing:

one or more monomers having a radical polymerizing unsaturated group, and wherein at least one of the monomers in the monomer mixture being emulsion-polymerized is a compound having a carboxylate group and the radical polymerizing unsaturated group, and said compound is present in an amount of 0.05 to 5 parts by weight per 10 parts by weight of monomers in the monomer mixture;

wherein the compound having the carboxylate group and the unsaturated group is represented by the following general formula (II):

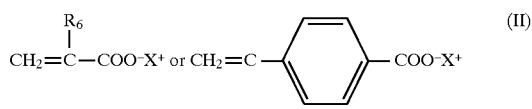

wherein in the formula (II), X⁺is one species selected from the group consisting of monovalent metal ion,

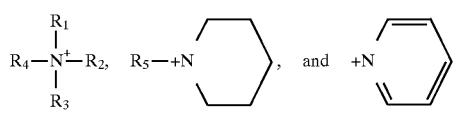

wherein $R_1$ to $R_5$ may be the same or different, representing hydrocarbon groups having a number of carbon atom or atoms of 1 to 4, and $R_6$ represents hydrogen or a methyl group.

4. The polymer fine particles according to claim 3, wherein the carboxylate group is present on surfaces of the polymer fine particles.

5. The polymer fine particles according to claim 4, wherein the polymer fine particles have an average particle diameter of 10 to 300 nm.

6. Polymer fine particles comprising a polymerization reaction product that is obtained by emulsion-polymerizing a monomer mixture containing:

one or more monomers having a radical polymerizing unsaturated group, and the emulsion polymerization is performed in the presence of a surfactant containing a carboxylate group;

wherein the carboxy sate group is represented by the following formula:

—COO⁻X⁺  (I)

wherein in the formula (I), X⁺is one species selected from the group consisting of monovalent metal ion,

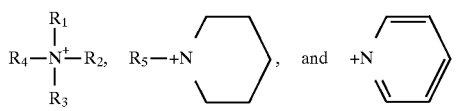

wherein $R_1$ to $R_5$ may be the same or different, representing hydrocarbon groups having a number of carbon atom or atoms of 1 to 4, respectively, and wherein the surfactant containing the carboxylate group is contained in an amount of 0.05 to 5 parts by weight per 10 parts by weight of monomers in the monomer mixture.

7. The polymer fine particles according to claim 6, wherein the carboxylate group is represented by the following formula:

wherein $Y^+$ is one species selected from the group consisting of:

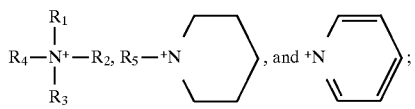

wherein $R_1$ to $R_5$ may be the same or different, representing hydrocarbon groups having a number of carbon atom or atoms of 1 to 4 respectively.

8. Polymer fine particles comprising a polymerization reaction product that is obtained by emulsion-polymerizing a monomer mixture containing:

one or more monomers having a radical polymerizing unsaturated group, and the emulsion polymerization is performed in the presence of a surfactant containing a carboxylate group;

wherein the surfactant containing the carboxylate group is contained in an amount of 0.05 to 5 parts by weight per 10 parts by weight of the monomer in the monomer mixture, and wherein the surfactant containing the carboxylate group is a compound represented by the following general formula (III):

$$R_7COO^-X^+ \qquad (III)$$

wherein in the formula (III), $X^+$ is one species selected from the group consisting of monovalent metal ion,

wherein $R_1$ to $R_5$ may be the same or different, representing hydrocarbon groups having a number of carbon atom or atoms of 1 to 4 respectively, and $R_7$ represents a hydrocarbon group having a number of carbon atoms of 6 to 18.

9. The polymer fine particles according to claim 8, wherein the carboxylate group is present on the surface of the polymer fine particles.

10. The polymer fine particles according to claim 9, wherein the polymer fine particles have an average particle diameter of 10 to 300 nm.

11. A preparation of polymer fine particles comprising a polymerization reaction product that is obtained by emulsion-polymerizing a monomer mixture containing:

one or more monomers having a radical polymerizing unsaturated group, and wherein at least one of the monomers in the monomer mixture being emulsion-polymerized is a compound having a carboxylate group and the radical polymerizing unsaturated group, and said compound is present in an amount of 0.05 to 5 parts by weight per 10 parts by weight of monomers in the monomer mixture;

wherein the carboxylate group is represented by the following formula:

$$-COO^-X^+ \qquad (I)$$

wherein in the formula (I), $X^+$ is one species selected from the group consisting of monovalent metal ion,

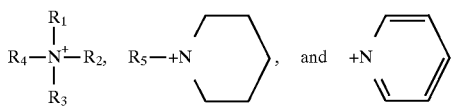

wherein $R_1$ to $R_5$ may be the same or different, representing hydrocarbon groups having a number of carbon atom or atoms of 1 to 4, respectively.

12. A preparation of polymer fine particles comprising a polymerization reaction product that is obtained by emulsion-polymerizing a monomer mixture containing:

one or more monomers having a radical polymerizing unsaturated group, and wherein at least one of the monomers in the monomer mixture being emulsion-polymerized is a compound having a carboxylate group and the radical polymerizing unsaturated group, and said compound is present in an amount of 0.05 to 5 parts by weight per 10 parts by weight of monomers in the monomer mixture;

wherein the compound having the carboxylate group and the unsaturated group is represented by the following general formula (II):

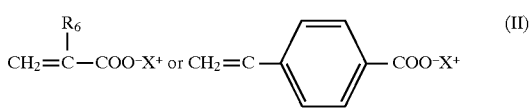

wherein in the formula (II), $X^+$ is one species selected from the group consisting of monovalent metal ion,

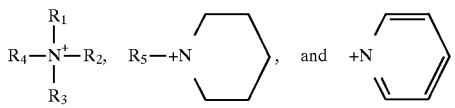

wherein $R_1$ to $R_5$ may be the same or different, representing hydrocarbon groups having a number of carbon atom or atoms of 1 to 4, and $R_6$ represents hydrogen or a methyl group.

13. A preparation of polymer fine particles comprising a polymerization reaction product that is obtained by emulsion-polymerizing a monomer mixture containing:

one or more monomers having a radical polymerizing unsaturated group, and the emulsion polymerization is performed in the presence of a surfactant containing a carboxylate group;

wherein the carboxylate group is represented by the following formula:

wherein in the formula (I), X⁺ is one species selected from the group consisting of monovalent metal ion,

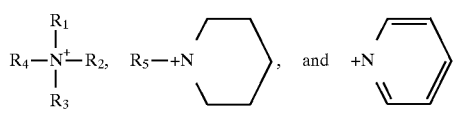

wherein $R_1$ to $R_5$ may be the same or different, representing hydrocarbon groups having a number of carbon atom or atoms of 1 to 4, respectively, and wherein the surfactant containing the carboxylate group is contained in an amount of 0.05 to 5 parts by weight per 10 parts by weight of the monomer in the monomer mixture.

* * * * *